ELECTRICAL DIGITAL MULTIPLIER DEVICES

Filed June 1, 1954 5 Sheets-Sheet 1

INVENTORS
GERARD JEAN RENÉ PIEL
& ROGER ROBERT DUSSINE
BY
Theodor [signature]
ATTORNEY Jan. 6, 1959 G. J. R. PIEL ET AL 2,867,380

ELECTRICAL DIGITAL MULTIPLIER DEVICES

Filed June 1, 1954 5 Sheets-Sheet 2

INVENTORS
GERARD JEAN RENÉ PIEL
& ROGER ROBERT DUSSINE
BY
Theodore Haper
ATTORNEY Jan. 6, 1959 G. J. R. PIEL ET AL 2,867,380

ELECTRICAL DIGITAL MULTIPLIER DEVICES

Filed June 1, 1954 5 Sheets-Sheet 3

INVENTORS
GÉRARD JEAN RENÉ PIEL AND
ROGER ROBERT DUSSINE
BY
[signature]
ATTORNEY

ELECTRICAL DIGITAL MULTIPLIER DEVICES

Filed June 1, 1954 5 Sheets-Sheet 4

INVENTORS
GERARD JEAN RENÉ PIEL
& ROGER ROBERT DUSSINE
BY Theodore Harper
ATTORNEY

ELECTRICAL DIGITAL MULTIPLIER DEVICES

Filed June 1, 1954 5 Sheets-Sheet 5

INVENTORS
GERARD JEAN RENÉ PIEL
& ROGER ROBERT DUSSINE
BY Theodore Haefner
ATTORNEY United States Patent Office 2,867,380

Patented Jan. 6, 1959

2,867,380

ELECTRICAL DIGITAL MULTIPLIER DEVICES

Gérard Jean René Piel and Roger Robert Dussine, Paris, France, assignors to Societe d'Electronique et d'Automatisme, Courbevoie, France Application June 1, 1954, Serial No. 433,750

Claims priority, application France July 2, 1953

36 Claims. (Cl. 235—61)

The present invention relates to electric multiplying devices for use in electric digital computers operating on trains of electrical pulses which represent numerical quantities expressed in the binary system of numeration, these multiplying devices are so arranged as to combine two incoming pulse trains representing, respectively, a multiplicand and a multiplier quantity, for delivering a result pulse train which represents the product of the multiplication.

The object of the invention is to provide improved digital multiplying devices of the so-called series type, wherein several pulse trains are developed, representing each a partial product of the multiplication operation, i. e. the product of the multiplicand quantity and one digit of the multiplier quantity, and wherein these partial product pulse trains are additively combined with suitable phase relationships and the final product pulse train is derived therefrom.

Series multiplying devices are known for the multiplication of a multiplier having N digits and a multiplicand also having N digits, whereby the product will have at most 2N digits.

When such a number is represented by a coded pulse train, this train is allotted a time interval equal to N$\theta$, wherein $\theta$ denotes the pulse period viz. the time interval allotted to any digit of the pulse trains.

The formation of a partial product consists of an elementary operation of multiplication of one of the multiplier digits by all the digits of the multiplicand. For instance a gate is controlled by the value of a digit of the multiplier train and the multiplicand is applied to the input of such a gate, the output of which delivers a partial product train. It takes a time of N$\theta$ to derive such a partial product train. For a complete multiplication, the N digits of the multiplier must sequentially be applied to the gate, receiving N times the multiplicand train of N$\theta$ duration. A multiplication operation may, at best, take N times N$\theta$, viz $N^2\theta$. This is not the case however in actual practice for the following reason: It is usual to provide the addition of the sequentially formed partial products within an accumulator of the recirculating loop type. It is apparent that, at the end of the operation, this accumulator must contain the possible 2N digits of the product pulse train. Such an accumulator comprises a looped delay line and an input adder one input of which receives the partial products trains in their time sequence and the other input of which receives the recirculated train. In the operation of such an accumulator, each time a fresh partial product is to be introduced, the previous content must have a phase lead by one digit with respect to the lowest order digit of this fresh product pulse train. The recirculating loop must then have a digital capacity $(2N-1)$ digits and consequently its electrical length must be equal to $(2N-1)\theta$. As a further result, a fresh product train cannot be introduced in the accumulator each N$\theta$ interval of time but only each 2N$\theta$ interval of time. The execution of a multiplication with such an arrangement will then obviously last N time 2N$\theta$, viz. $2N^2\theta$ time intervals. The first partial product pulse train straightly passes through the adder of said store and is brought back through the recirculating loop to the input of said adder with a one pulse period phase lead with respect to the second partial product train so that these two pulse trains are added together with this suitable phase relationship; the recirculating pulse train issuing from the adder itself is brought back with a further phase lead of one pulse period to the input of said adder with respect to the third partial product train; and so forth. The complete pulse train, of 2N pulse periods, which represents the product of operation, is obtained from the Nth addition thus made, viz. the addition of the Nth partial product pulse train to the recirculating pulse train within the store which represents the result of the $(N-1)$ preceding accumulations. This final product train which results from said Nth addition then is derived out of the store, either at the output of the adder or at the output of the recirculating loop.

An object of the invention is to provide improved series multiplying devices of such general type as to require for operation an overall time interval of only $N^2\theta/p$, wherein $p$ is an integer submultiple of N including $p=1$.

Another object of the invention is to provide improved series multiplying devices of such general type as to form the partial product trains in $N/p$ groups of $p$ partial products at a repetition rate or the rate of availability of the multiplicand pulse train, of $1/N\theta$ and to add each group of $p$ partial product trains thus formed in an accumulative recirculating loop store. The result derived from this store is a product train which represents that part of the product train including the N pulse periods or digits of higher weights. On the other part, when required, that part of the product train including the N pulse periods or digits of lower weights can be separately stored and issued in advance of the higher weight part of the product train.

In the following, that part of a complete product pulse train which includes the N digits of higher weights will be called the significant or higher order product pulse train, and that part which includes the N digits of lower weights will be called the complement or lower order product pulse train.

It should be remembered at this point, that an adder of any appropriate technological concept will be so arranged that, upon receiving a pair of incoming pulse trains each representing a numerical quantity, it will deliver a coded output train representing in its pulse distribution with respect to time, the net or correct result of the addition of the two input quantities. Furthermore, such an adder will contain such means as are necessary to form any carry pulse which may occur during its operation and, to reapply through a delayed internal transmission path, such carry pulses to a special carry-over input. These carry-over pulses will then be effective within the adder together with the pulses of both incoming pulse trains. This internal transmission path or feedback loop includes a delay element, such as a portion of artificial magnetic delay line for instance. The time shift imparted to the carry pulses by said delay element is so adjusted that any carry pulse is effective at the pulse period which immediately follows the pulse period in which it has been formed. Some known structures of adders do not present any delay of operation between the instant of application of the incoming pulses to be combined and the instant of issuance of the result pulses and/or of formation of the carry pulses. In such a case, the above-mentioned time shift is made equal to one pulse period of the coded trains. Such adders for instance are structurally based upon coincidence and anticoincidence circuits. There are other structures known including internal delays, and an appropriate time-shift design such as adders structurally based upon pulse counters where the pulses to be counted must be shifted with respect to each other.

As will be apparent from the following, the actual constitution of the adders which will be used in devices embodying the present invention is not important for the invention, provided they include a carry-over feedback loop such as defined above.

In order to achieve the purposes of the invention, firstly an adder is modified in the following manner:

(*a*) Gating means are provided at the result output of the adder for cancelling at said output any first pulse period digit of any result pulse train;

(*b*) Gating means are provided in the carry-over feedback loop of the adder for cancelling at its output any carry pulse which may be formed at the last pulse period of any of its addition operations;

(*c*) On the other hand, gating means are provided at the carry output of the adder for routing any such carry pulse as defined in (*b*) to the result output of the adder;

—A modified adder including these three gating means will be called a gate-conditioned adder—

(*d*) When necessary, further gating means are provided at the result output of the adder for routing to a special output, which will be called a lower order product result output, any such pulse otherwise cancelled from the normal result output by gating means (*a*);

—A modified adder including these four gating means will hereinafter be called a complete gate-conditioned adder.

In accordance with the invention to constitute the accumulative recirculating loop store of a series multiplying device consists of a recirculating loop of $(N-p)$ digital places, viz. having a transit time of $(N-p)\theta$, in series with a number $p$ of gate-conditioned adders. This device delivers only the higher order product pulse train of a multiplication. In order to deliver the complete result pulse train of a multiplication, the special outputs of a number $p$ of complete gate-conditioned adders are operatively connected to the input of another recirculating loop store also having $(n-p)$ digital places for storing the complement result pulse train of a multiplication. Each of these stores are provided with output gating means for the sequential issuance of their contents at the appropriate instants with activating means so arranged as to derive, from multiplicand and multiplier trains, $p$ partial product trains at a time, in accordance with successive groups of $p$ digits of the multiplier pulse train, at a repetition rate of $1/N\theta$. At the same time these $p$ partial products trains are applied to the respective inputs of the $p$ gate-conditioned or complete gate-conditioned adders.

These and other objects of the invention will be more fully apparent from the attached drawings, wherein.

In order to simplify drawings and the description, the component parts are illustrated in block schematic representation. It must be stated however that their technological constitutions or structures can be considered as well-known per se at the present state of the art and that their assembly will be a matter of engineering routine.

In order to facilitate understanding the following components are explained by way of examples:

(1) A gate, receiving a signal whether it is to be transmitted or not, under the control of another signal, may consist of a pentode tube. The transmission signal is applied to the control grid while the control or gating signal is applied to the suppressor grid. When this latter signal is zero, the tube does not conduct. When the issuing signal must be delivered with the same polarity as the incoming signal, a polarity inverter tube is controlled from the output of the pentode tube and before the signal is used;

(2) A delay element, or transit time element, used in the construction of a storage recirculating loop, may consist of an artificial electromagnetic delay line, matched at one end thereof with its characteristic impedance. The "electric length" of such a delay line is a measure of the time of transit:

(3) A one-digit static store may consist of a bistable trigger stage, for instance of the flip-flop type.

As stated above, a multiplying device in accordance with the invention is designed to operate in an electric digital computer. Its operation, therefore, will be controlled from the general or program circuits of such a computer. In such a computer, there exist means for generating uninterrupted series of pulses recurring at the repetition rate $1/\theta$. Such pulses will be called timing or clock pulses.

Figure 1:
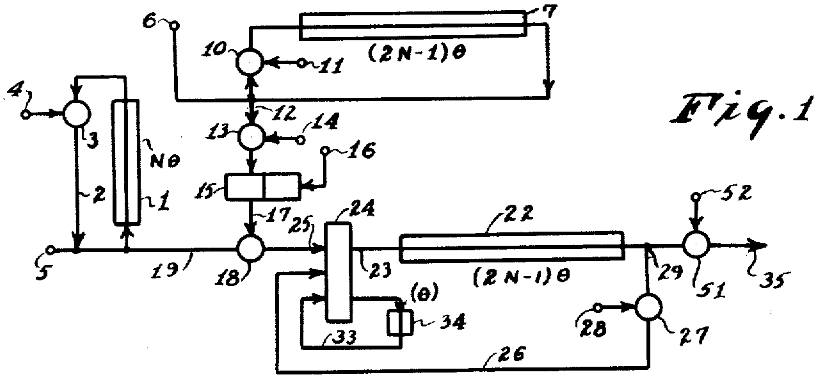
Fig. 1 shows a conventional well-known arrangement of a series multiplying device.

In the arrangement of Fig. 1, delay line 1 has N digital places and thus an electric length of $N\theta$. Delay line 1 is shunted or looped over by line 2 and in series with gate 3. Such a looped store will be assumed to constitute the store for any multiplicand representative pulse train. A multiplicand pulse train represents a quantity M and comprises N digits, $D_1$ $D_2$ . . . $D_N$ in the sequence of their increasing weights of the binary numeration system. Each digit, as usual, may be either 0, no pulse, or 1, a pulse. Gate 3 plays the part of a maintenance and suppression control element with respect to the content of the store. It also serves as a pulse regenerative amplifier or translator for the stored pulses. For this purpose the timing pulses of the repetition rate $1/\theta$ of the computer are applied at 4 each time a fresh multiplicand pulse train has been completely introduced from terminal 5 into delay line 1. During such an introduction period, however, corresponding to a minor cycle of the computer, these timing pulses are suppressed or not applied at 4. In this way gate 3 is blocked with respect to the transmission of an old pulse train through delay line 1. Such an old train is erased during the introduction of a fresh train.

Any coded pulse train representing the multiplier quantity *m* also includes N digits, $d_1$ $d_2$ . . . $d_N$ in the same order of increasing weights of the binary system of numeration. This train will be introduced in another store including a delay line 7 having an electrical length of $(2N-1)\theta$, viz. $(2N-1)$ digital places. The corresponding storage loop includes line 9 and gate 10 which can receive at 11 certain control pulses as will be explained further below. These control pulses will be selected from the timing pulses of the computer. Input terminal 6 of such a multiplier store is connected, for instance, to point 12 at the input of gate 10.

Point 12 also feeds a further gate 13 which is controlled by the application of pulses to its control input 14. A control pulse, selected from the above mentioned timing pulses, is applied at 14 at each first pulse period of any minor cycle of the computer. A minor cycle may be an interval of N pulse periods during which trains such as multiplicand or multiplier pulse trains can be applied to their respective inputs 5 and 6 of the multiplying device. On the other hand the first pulse period pulses are omitted in the sequence of timing pulses applied at 11 for controlling the gate 10 so that gate 10 is not conductive at any first pulse period of any minor cycle.

The output of gate 13 is connected to one actuation input of a bistable trigger stage 15, constituting a one-digit store. At each Nth or last pulse period of any minor cycle of the computer, trigger stage 15 is reset through the application of a timing pulse at its other actuation input 16, which is slightly delayed with respect to the instant of beginning of the last pulse period. With such a reset control, one-digit store 15 will either be brought back to zero if it has registered digit one at the beginning of the minor cycle concerned, or merely confirmed into its zero condition if such a digit-one denoting pulse has been lacking in the minor cycle concerned.

When a fresh multiplier code train is applied to input terminal 6, the first digit, occurring in the first pulse period of this pulse train, is not transmitted to the delay line 7, gate 10 being blocked. If, however, a discrete pulse denoting the digital value 1 does exist at the first digital place of the train, this pulse will be transmitted through the gate 13 which is unblocked at this pulse period, and one-digit store 15 will register this pulse. On the other hand, if no pulse exists in the first pulse period of the incoming pulse train, denoting the digital value 0 at this digital place, one-digit store 15 will remain in its zero condition.

On the other hand, the $(N-1)$ following digits of the incoming multiplier train will be transmitted through gate 10 to delay line 7 but gate 13 will not transmit the pulses (if any) existing in these pulse periods as no control pulse is applied at 14, during this latter time interval.

Obviously, at least during the next preceding minor cycle gate 10 would not have to transmit any pulse to delay line 7, as will be apparent from the following.

The storage delay line 7 has $(2N-1)$ digital places, and the $(N-1)$ digits were introduced as stated above through gate 10 during the minor cycle wherein a fresh multiplier pulse train was applied at 6. The first of these $(N-1)$ digits, therefore, will reach again the input of the gate 10 (and also the input of the gate 13), after a time interval equal to $2N\theta$. The one-digit store 15 will have been reset to its zero or void condition, if it has been filled to its one-condition at the above specified instant of time. This first digit of the $(N-1)$ digits, viz. the second digit of the multiplier train, will then be transmitted to the one-digit store 15 through gate 13 but will not be transmitted again to delay line through the gate 10. This latter gate will only pass the remaining $(N-2)$ digits, the first of which will be the digit $d_3$ of the incoming multiplier pulse train to be stored.

The same process will be repeated at each time interval of $2N\theta$ and finally, the N digits of the multiplier trains will successively be applied to the one-digit store 15 as they are successively erased during the storage loop for the multiplier pulse train. The multiplier pulse train has thus been progressively erased from its store and another fresh multiplier pulse train can then be introduced from a minor cycle following the erasure of the Nth digit of the preceding multiplier pulse train. The rate of introduction of successive multiplier pulse trains in the multiplier device can be $1/2N^2\theta$ because an operation of multiplication in the concerned embodiment lasts a time interval equal to $2N^2\theta$.

Referring back to the multiplicand pulse train, and the minor cycle during which it has been applied to input terminal 5, this train has been applied with a repetition rate of $1/N\theta$, to input terminal 19 of a gate 18. Input terminal 19 is also connected to line 2 of the multiplicand store. The condition of gate 18 is controlled from one-digit store 15, through 17, so that, any time one-digit store 15 denotes a digital value 1, the gate 18 is unblocked and any time one-digit store 15 marks a digital value 0, gate 18 is blocked.

In sum one-digit store 15 sequentially and at a rate of $1/2N\theta$, will contain the successive digits $d_1, d_2 \ldots d_n$ of the multiplier quantity, each during a time interval substantially equal to $N\theta$, viz. the time interval of one minor cycle of the computer. For each value of digits $d_1$ to $d_N$ equal to 1, gate 18 is unblocked. Since gate 18 receives at the rate of $1/N\theta$, the complete multiplicand pulse train, the N partial product pulse trains $d_1xM$, $d_2xM$, . . ., $d_NxM$ are sequentially formed at the rate of $1/2N\theta$, each of these partial product trains having a duration $T=N\theta$.

Now gate 18 applies the partial product trains to one input 25 of an adder 24 forming part of the accumulator recirculating loop store of the multiplying device. This store comprises a delay line 22 of $(2N-1)$ digital places, viz. an electrical length of $(2N-1)\theta$, and a feedback lead 26 extending from output 29 through gate 27 to another input of adder 24. Adder 24 is assumed to be of the type having three separate inputs, including a carry-over input extending to internal carry-over feedback loop 33 including delay element 34. For the sake of simplicity, adder 24 is assumed to present no internal delay and consequently delay element 34 has an electrical length corresponding to $\theta$. The result output 23 of adder 24 is connected to the input of the delay line 22. Output point 29 of delay line 22, is also connected to gate 51 and gate 51, by suitable application of control pulses at 52, will be used to control the issuance of the final product train from line 35.

The first partial product train, $d_1xM$, applied at 25, issues unchanged from adder 24 at 23 and is routed into delay line 22 from which through gate 27 it is f d back to input 26 of the adder. The first digit $d_1xD_1$ of the first partial product pulse train reaches this input a time interval of $(2N-1)\theta$ after its first application to adder input 25. It is translated without any change to an output 23. The second digit $d_1xD_2$ of the pulse train reaches input 26 a time $\theta$ after the first, and occurs in phase coincidence with the first digit of the second partial product train from 18, $d_2xD_1$ of pulse train $d_2xM$. From this instant, the two partial product trains are added, with phase shift of $\theta$, the first leading over the second pulse train. At the next following storing cycle the two first digits of the train contained in the store and representing the result of addition of the two first partial product trains, will lead with respect to the first digit, $d_3xD_1$ of the third partial product pulse train $d_3xM$ from 18. Only at the third digit $d_3xD_3$ of the third partial product train, the addition operation proper will begin; and so forth. At the Nth storage cycle, $(N-1)$ digits of the pulse train in the store will pass over adder 24 before the operation of addition begins with respect to the last partial product train from 18, $d_NxM$. From this instant, and after a time interval of $N\theta$, the gate 27 is blocked by the omission of its control pulses at 28. On the other hand, gate 51 is unblocked by the application of control timing pulses at 52, during a time interval of two complete minor cycles $(2N\theta)$. The complete final product train will thus issue at output line 35.

In other respects, the arrangement of Fig. 1 and its operative process are well-known from the prior art and they do not necessitate any further specifications.

Figure 2:
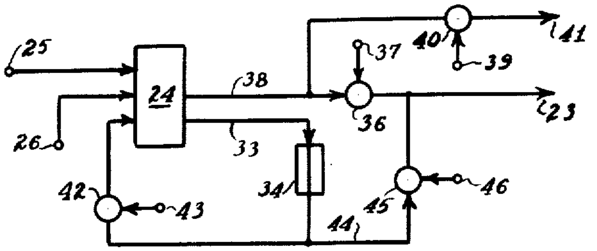
Fig. 2 shows an adder modified in accordance with the invention.
Figure 6:
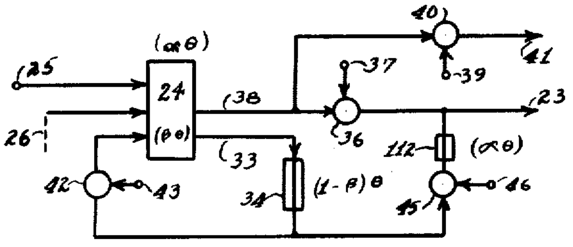
Fig. 6 shows the manner of adaptating the gate-conditioned adder of Fig. 2, which did not include any internal transit time of operation, modified by an adder structure including an internal transmission delay.

In order to provide an improved arrangement whereby the overall time interval of a multiplication can be substantially reduced, the invention firstly contemplates a modified adder for use in such multiplying devices. The structure of a modified adder is shown in Fig. 2, It has no internal transmission delay between input and output terminals. Fig. 6 will show such a modified adder incorporating such internal delays.

Figure 3:
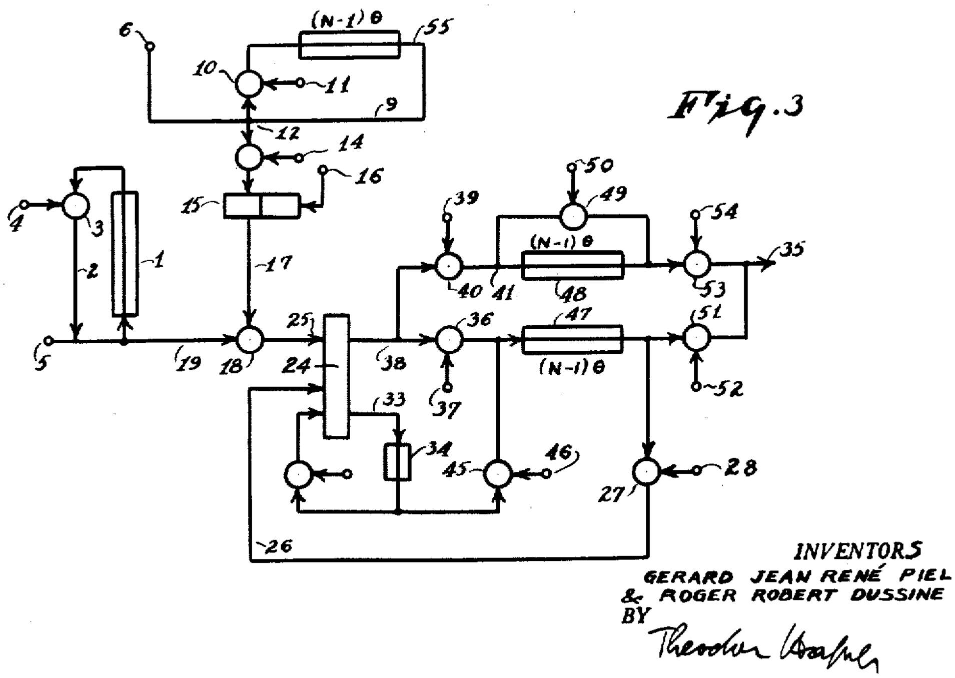
Fig. 3 shows a series multiplying device according to the invention and resulting from the replacement of a conventional adder by the adder of Fig. 2, and the corresponding adjustment of the other components thereto the operation of this adder.

In a gate-conditioned adder according to the invention, the internal structure of the adder is substantially irrelevant. A gate 36 is inserted between the true output 38 of the adder circuit and the actual output 23 of such an adder when it is placed within an accumulator recirculating store of a series multiplying device, as shown in Fig. 3. In case only a higher order product pulse train is desired, such it will be sufficient to connect to output 38 a gate such as shown at 36. In case a lower order product pulse train is desired, a further gate 40 is added and fed by result output 38. The gating control input of gate 36 will receive the timing pulses at any pulse period of the minor cycles (forming the time reference peculiar to the concerned adder arrangement) other than the first one. On the other hand, gate 40 will receive at its gating control input 39 the only timing pulses suppressed in the application of the timing pulses to 37, or any timing pulse occurring at the first pulse period of any minor cycle (also considering the time reference peculiar to the concerned adder arrangement). Such time reference is clearly apparent when considering arrangements such as shown in Figs. 3, 4, and 7 to 10.

In series with delay element 34 in the carry-over feedback loop of the adder, there is provided another gate 42. This gate 42 is so controlled from its gating input 43 as to be inoperative, or blocked, at any first pulse period of any such minor cycle as defined above. At any other pulse periods, activation of this gate for its conductivity is made by the timing pulses of the computer. Derivation 44 of this feedback loop, is connected after the delay element 34, to another gate, 45, the output of which is connected to the result output 23 of the adder arrangement. Gate 45 is so controlled by application of the gating pulses at its control input 46, that only those pulses (if any) occurring at the first pulse period of any minor cycle of this adder arrangement are transmitted to output line 23.

In such an adder arrangement therefore, when two incoming pulse trains are applied to the respective inputs 25 and 26, the digit issuing at the first pulse period of these trains at 38 will be cancelled from output line 23. On the other hand, the digit will be routed, if required, by gate 40 to a special output line 41. The following digits, from the second pulse period of the Nth pulse period will be routed by the gate 36 to normal output line 23. Any carry pulse occurring at the Nth pulse period will not be fedback to carry-over input 42 of the adder at the first pulse period of the next following minor cycle of the adder, but will be routed at this first pulse period, to output line 23. A carry pulse thus routed will appear on line 23, and consequently within delay line 47 of Fig. 3, at a pulse period of the issuing pulse train following the last pulse period of the highest weight of the addition result train.

In accordance with the invention such an adder arrangement is substituted for a conventional adder arrangement in a series multiplying device of the type shown in Fig. 1. In such a device, delay lines 47 and 55, each of $(N-1)$ digital places, viz. of an electrical length of $(N-1)\theta$, are substituted for delay lines 22 and 7 of Fig. 1, respectively.

When necessary (and corresponding to the provision of the gate 40 in the above mentioned gate-conditioned adder), an additional store is added as shown in Fig. 3. This store comprises a delay line 48, also of $(N-1)$ digital places, forming a recirculating loop in series with a gate indicated at 49. From control terminal 50, gate 49 will receive any timing pulse from the first minor cycle of an operation of addition to the first pulse period of the last minor cycle while a partial product is transferred to accumulative loop 47 in the operation of multiplication. From this instant, however, gate 49 will be blocked and another gate, 53, will be unblocked during a time interval $N\theta$ by the timing pulses applied to control input 54. The output of gate 53 is connected to final output line 35 in parallel with the output of gate 51 of accumulative store 47. Gate 51 is so controlled from its control input 52 as to transmit the content of the accumulative store to line 35 during a time interval of $N\theta$ after the time interval $N\theta$ during which the gate 53 has transmitted to said lead 35 the content of recirculating store 48—49.

In such a case, finally, the complete product train will issue on line 35. It will be seen that store 48—49 effectively contains the lower order product train the accumulative store contains the significant product train. In case the latter train only is desired, gate 40 is omitted together with its associated store and output means. In other words, a complete gate-conditioned adder is replaced by a mere gate-conditioned adder as stated above, and obviously in such a case, any store is unnecessary for the cancelled complement pulse train.

The operation of the arrangement of Fig. 3 may be described as follows:

From the instant when the multiplier pulse train $m$ is applied at 6 and the multiplicand pulse train is applied at 5, the first minor cycle of operation contains the formation of the first partial product train $d_1xM$ and its transmission through adder 24. In this transmission, however, the first digit $d_1xD_1$ of this train is suppressed on line 38. On the other hand, gate 40 transmits this first digit to the lower order product store 48—49. The $(N-1)$ ther digits, from $d_1xD_2$ to $d_1xD_N$ are transmitted through the delay line 47 of the accumulative store.

Since digit $d_1$ of the multiplier pulse train $m$ has been cancelled in the multiplier store 55—10, the following digit $d_2$ will reach the point 12 at the first pulse period of the next following minor cycle and be registered on one-digit store 15 while it is cancelled from the stored pulse train in its recirculation. Line 55 has a length of $(N-1)\theta$ and consequently the change of digits of the multiplier in one-digit store 15 will occur each time interval $N\theta$, without any lost interval. As the multiplicand pulse train M is recurrently applied to the gate 18 at the rate $N\theta$, the second product partial pulse train is immediately formed and applied to the input 25 of the adder. Such partial product, trains will now follow one another without any lost time interval and the operation of formation of such partial product trains will not be considered any more in the explanation of the operation of the device of Fig. 3.

Due to the reduced digital place number (N—1) of the delay line 47 of the accumulative store, the first partial product pulse train (less its first digit) is brought back to 26 with its first significant digit $d_1xD_2$ coincident in time with the first significant digit $d_2xD_1$ of the second partial product train appearing at 25. The additive combination of these two digits results in an outgoing digit which is routed through 40 to lower order product store 48—49 but is not transmitted to accumulative store 47. In this lower order product store, the digit occurs in the pulse period which follows the pulse period then occupied by the previously stored digit. The remaining digits from the additive combination of the second partial product train and the previously stored train, are normally routed through 36 to accumulative store 47. However the second partial pulse train at 25 includes N digits and its digit preceding the last digit, namely $d_2xD_{N-1}$ is combined with the last digit $d_1xD_N$ of the first partial product pulse train. Either due to the mere combination of these two digits, or due to a carry from a preceding combination, the result may comprise a carry. If then the last digit $d_2xD_N$ is of the value 1, a further carry will be initiated. Such a carry must be placed at a $(N+1)$th digital place of the addition result, and actually it will be so placed through the gate 45; at the same time it will be suppressed by gate 42 in its feedback as has been explained with reference to Fig. 2. At the instant when such a carry is delivered on 23, the gate 36 is not controlled to be conducting, because this instant actually is the first pulse period of the third minor cycle of operation in which the result output digit is routed through 40 to the lower order product store.

Such a process is continued throughout the complete operation of multiplication. Each partial sum pulse train will have its first digit routed to the lower order product store and its other $(N-1)$ digits combined with the N digits of the next incoming partial product pulse train, as stated afore.

At the instant of the Nth digital place of the minor cycle preceding the last minor cycle, during which has been formed the $(N-1)$th partial product pulse train, the $(N-1)$ digits in the lower order product store are contained in the delay line 48. At the start of the last minor cycle of multiplication wherein the Nth partial product pulse train will be formed, gate 49 is blocked and gate 53 is unblocked for a time interval equal to $N\theta$. The first digit of the lower order product store immediately issues at 35. Concomitantly the last digit to be introduced into this lower order product store is routed through the gate 40. During the $N\theta$ time interval, the N digits constituting what has been called the lower order product pulse train will issue at 35, and the complemental store will then remain without any registration. During this issuance period, the last addition of the operation will be effected in the adder. At the end of the last minor cycle, therefore, the first digit of the higher order product pulse reaches point 29. At this instant, gate 53 will be blocked and gate 51 will be unblocked for a time interval of $N\theta$. During this further time interval therefore, the significant part of the product train will issue at 35, without any gap with respect to the lower order product pulse train of this product.. A complete product train, having an overall duration of $2N\theta$ has thus been obtained.

Actually the complete operation of multiplication has lasted a time interval equal to $N_2\theta+(N\theta)$. In practice however, only the time interval $N^2\theta$ needs to be considered for the following reason: In the additional minor cycle of $N\theta$, fresh multiplicand and multiplier pulse trains can be introduced into their respective stores, and consequently the first partial product of such a fresh multiplication can be obtained and applied to both accumulative and lower order product stores. This is because on the one hand the latter store is empty and can receive the first digit of the first partial product pulse train. On the other hand, the digit of the said partial product train introduced in 48, which is the second digit of said fresh partial product pulse train, in delay line 47 will place itself at a digital pulse place, which is empty and which follows the digital pulse place of the last digit of the significant product pulse train from the previous operation of multiplication. Consequently, with an arrangement such as shown in Fig. 3 an operation of multiplication can be effected each $N^2\theta$ time interval.

A further decrease in the time length of an operation of multiplication may be obtained from the cascaded insertion of several gate-conditioned adders in the accumulative store of the above multiplying device. In this respect Fig. 4 exemplifies the modifications of Fig. 3 for a two gate-conditioned adder store.

The output of the gate 36 of the first gate-conditioned adder is connected to one input of a second gate-conditioned adder 74. The result output of the second adder is provided with gates 76 and 70 respectively similar to gates 36 and 40 of adder 24. The output of 76 is connected to the input of delay line 47. Delay line 47 presents now only $(N-2)$ digital places and consequently is provided with an electrical length of $(N-2)\theta$. The output of the gate 70, controlled from timing pulses at 69, is connected to the input of delay line 48 which is also restricted to $(N-2)$ digital places. Both outputs 41 and 71 are thus connected in common to the input of the lower order product store.

The internal feedback loop of the adder 74, including delay element 84 having a transit time of $\theta$, contains two gates 82 and 85 respectively corresponding to gates 42 and 45 of the first adder 24.

The gate controls of the second adder are shifted by one pulse period with respect to the gate controls of the first adder, the latter controls lagging with respect to the former.

In the multiplier pulse train store, the delay line 55 is provided with $(N-2)$ digital places. A further derivation 62 is provided in parallel to the derivation 12, and from said further derivation is controlled a gate 63 having its conductivity also controlled by the application of timing pulses. These timing pulses are applied to terminal 64, so as to render gate 63 conducting at each second pulse period of any minor cycle of operation of the computer. The output of gate 63 is connected to one actuation input of a one-digit store 65, similar to the one-digit store 15. One-digit store 65 is periodically reset for erasure of its casual content, by the application of timing pulses to its reset input 64. The phase of these reset pulses is shifted back by one pulse period with respect to the phase of the reset pulses applied to 16 for the first one-digit store 15.

In the multiplier pulse train store, further, gate 10 is made inoperative during each two first pulse periods of any minor cycle. This is done by applying unblocking timing pulses to input 11, corresponding to the third to the Nth pulse periods of any minor cycle.

From its output 67, one-digit store 65 controls the condition of a gate 68, the output of which is connected to one input of the second adder 74. This gate 68, through delay element 79 having a transit time of $\theta$, receives the multiplicand pulse train with a lag equal to $\theta$, with respect to the gate 18.

The operation of the device of Fig. 4 may be explained as follows:

The N digit pulse train representing the multiplier quantity $m$ is applied at 6 when the N digit pulse train representing the multiplicand quantity M is applied at 5.

At the first pulse period, gate 13 is unblocked and the first digit of the multiplier pulse train is brought into the store 15; on the other hand, this first digit is not transmitted to 55, gate 10 being blocked; consequently, the first partial product trans $d_1x$M will develop through the gate 18 and will be transmitted to adder 24 during the first minor cycle of the computer.

At the second pulse period, the gate 13 is blocked but gate 63 is unblocked, digit $d_2$ of the multiplier pulse train is transmitted to one-digit store 65. This insures the control of the formation of the second partial product pulse train, through gate 68 and from the multiplicand train delayed by $\theta$. This second partial pulse train is applied to adder 74 and, consequently, the minor cycles of the operation of addition for this adder 74 may be considered as shifted by one pulse period with respect to the minor cycles of the operation of addition of the first adder 24, which are phased over the minor cycles of operation of the device.

It is quite apparent that such a process will be repeated at time intervals of $N\theta$ for the generation of the third and fourth partial product trains, and so forth. Obviously, in this case, N is even.

Considering the initiation and transmission of the first partial product trains, digit $d_1xD_1$ is cancelled by 36 and routed through 40 to the lower order product store. The second adder will operate on pulse trains:

$$d_1xD_2+d_1xD_3+\ \dots\ +d_1xD_{N-1}+d_1xD_N$$

and $$d_2xD_1+d_2xD_2+\ \dots\ +d_2xD_{N-2}+d_2xD_{N-1}+d_2xD_N$$

the first pulse train has $(N-1)$ digits and the second N digits. The complete addition respult train, S1, may present $(N+1)$ digits. However the first digit of the addition result train will be cancelled by gate 76 and routed to the lower order product store through 70 in a pulse period next following the pulse period in which the digit $d_1xD_1$ has been registered in this store. In this lower order product store, the two digits $d_1xD_1$ and $S1_1$ are consequently introduced for recirculation. In the delay line 47 the remainder of the first N-digit addition result pulse train $S1_2$ to $S1_{N+1}$, recirculates. The last digit $S_{N+1}$ will be routed into delay line 47 through the gate 85 and may only consist of a carry pulse which is cancelled from reinjection by gate 82.

Considering initiation and transmission of the two next following partial product pulse trains, $d_3x$M and $d_4x$M and the first pulse period of the pulse train $d_3x$M, at such an instant of time, the first digit of train S1, viz. $S1_2$, reaches the input 26 of the first adder 24 and the first digit $d_3xD_1$ reaches input 25 of this adder. The first digit of this new partial sum pulse train, viz. $S2_1$, is cancelled by gate 36 but routed to the lower order product store through 40. Within this store, this digit occurs in the third digital place of the recirculating trains, i. e. after digit $S1_1$. At the same time, digit $S1_N$ of the partial sum pulse train S1 will issue from 76.

After a time interval $\theta$, when adder 24 delivers digit $S2_2$ to input of the second adder 74 to which it is connected, adder 74 also receives first digit $d_4xD_1$ of partial product pulse train $D_4$. Adder 74 forms the first digit of the third partial sum pulse train S3, viz. $S3_1$, but this digit is routed to the lower order product store through 70 and not to the delay line 47, since 76 is blocked. On the other hand, at this moment digit $S1_{N+1}$ is transmitted to this delay line through 85. In the lower order product store, digit $S3_1$ occurs in the fourth digital place of the circulating train.

This operation now proceeds further and, at the beginning of the last initiation of the partial product trains $d_{n-1}x$M and $d_Nx$M, i. e. at the $N/2$th of such initiation of pairs of partial product pulse trains, the complemental store contains $(N-2)$ digits, viz. $d_1xD_1$, $S1_1$, $S2_1$, . . ., $S(N-3)_1$. It will then receive the two last digits $S(N-2)_1$ and $S(N-1)_1$ with their relative phase shift $\theta$, but since gate 49 is blocked, and gate 53 unblocked, the whole pulse train of N digits will pass over to the output 35 during a time interval of $N\theta$. Then gate 51 is unblocked and gate 27 is blocked, so that the N digits of the accumulative store will now pass over to output 35 of the multiplying device. A complete product pulse train has been obtained during a time interval of $N^2\theta/2$, not counting the last $N\theta$ time interval as has been explained above.

Figure 4:
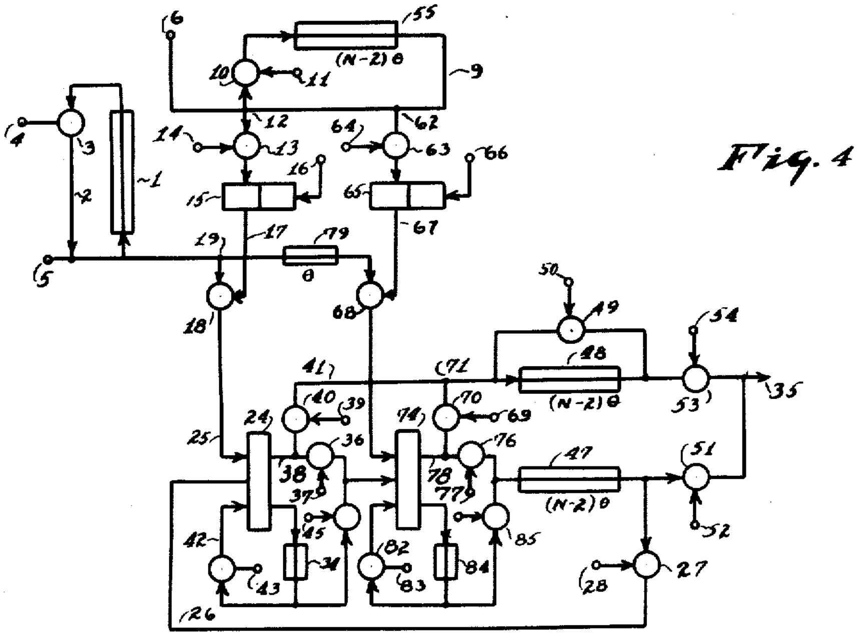
Fig. 4 shows an alternative embodiment including a pair of cascade connected gate-conditioned adders.
Figure 5:
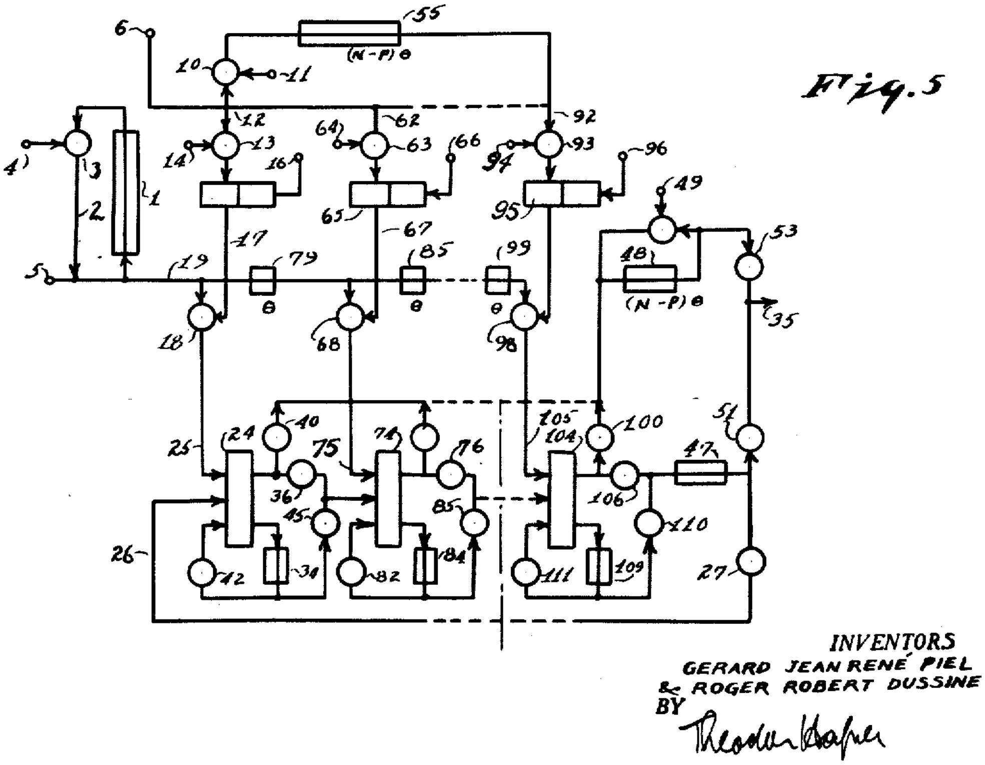
Fig. 5 shows in a general way a series multiplying device according to the invention, and resulting from an extension of the diagrams of Figs. 3 and 4 to $p$ gate-conditioned adders.
Figure 5A:
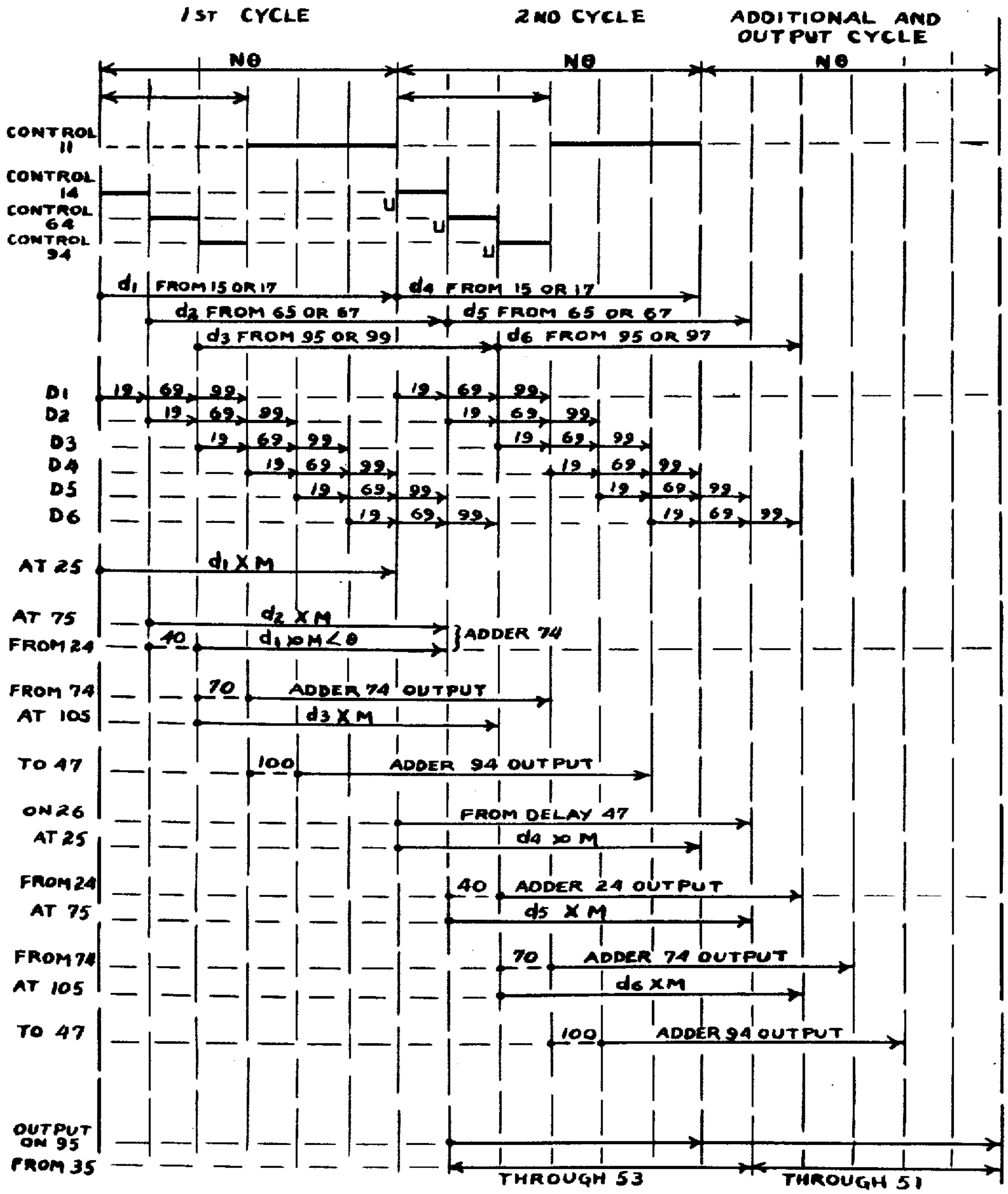
Fig. 5*a* represents a corresponding timing chart; manner of adaptating.

Fig. 5 shows the extension of the arrangement of Fig. 4 to a number $p$ of gate-conditioned adders, this number $p$ being a sub-multiple of the number N. In such an arrangement, delay lines 55, 47 and 48 include each only $(N-p)$ digital places. A number of $p$ derivations 12, 62, . . ., 92 are provided from the input of gate 10, and gate 10 of the multiplier store is so controlled as to be blocked during the first $p$ pulse periods of any minor cycle of the computer. In these $p$ derivations are inserted $p$ gates 13, 63, . . ., 93 so controlled from their respective control inputs 14, 64, . . ., 94 that they are sequentially made conducting, each for one pulse period of the $p$ first pulse periods of any minor cycle of operation. The multiplicand pulse train is applied to the inputs of $p$ gates 18, 68, . . ., 98 through delay elements such as 79, 85, . . . 99, each having a transit time of $\theta$, and these gates are controlled from respective one-digit stores 15, 65, . . . 95 which in turn are controlled from the gates 13, 63, . . ., 93. With such an arrangement, $p$ partial product pulse trains are generated, each time with relative phase shifts of $\theta$ and applied to the respective inputs 25, 75, . . ., 105 of the $p$ adders 24, 74, . . . 104. The last added 104 is shown on the drawing with its conditioning gates 106—100 and 111—110. Gate 100 has its output connected to the input of the complemental store, as are the outputs of gates 40, 70, . . ., and the output of adder gate 106 connected to the input of the delay line 47 of the accumulative store. The same applies to the output of gate 110 of the carry feedback circuit including delay element 109.

The operation of the Fig. 5 is a mere extension of the operation of Fig. 4 and from this point of view, no detailed description is necessary.

From the arrangement of Fig. 5, several alternatives may be derived, mainly for the case that each adder presents internal delays of operation. For such an adder, reference will be made to Fig. 6.

In the adder of Fig. 6, the issuance at 38 of any result pulse is delayed by a time interval $\alpha\theta$ with respect to the input digits; similarly the issuance at 33 of any carry pulse is delayed by a time interval $\beta\theta$ with respect to the input digits. Each of these delays, which may be equal, are at most equal to $\theta$, the time interval allotted to a pulse period in any pulse trains.

Consequently, the delay provided by delay element 34 of the carry feedback loop of the adder is taken equal to $(1-\beta)\theta$. The overall delay of this loop must be maintained equal to $\theta$, from the carry pulse input through the adder and its feedback loop back to the same carry input. The time instants for controlling the gates 42 and 45 are not changed but an additional delay element 112 of a transit time equal to $\alpha\theta$, is inserted between the output of gate 45 and the output result line 23. Gates 36 and 40 are controlled with a lag of $\alpha\theta$ with respect to their control instants in the preceding arrangement of Fig. 2.

Figure 7:
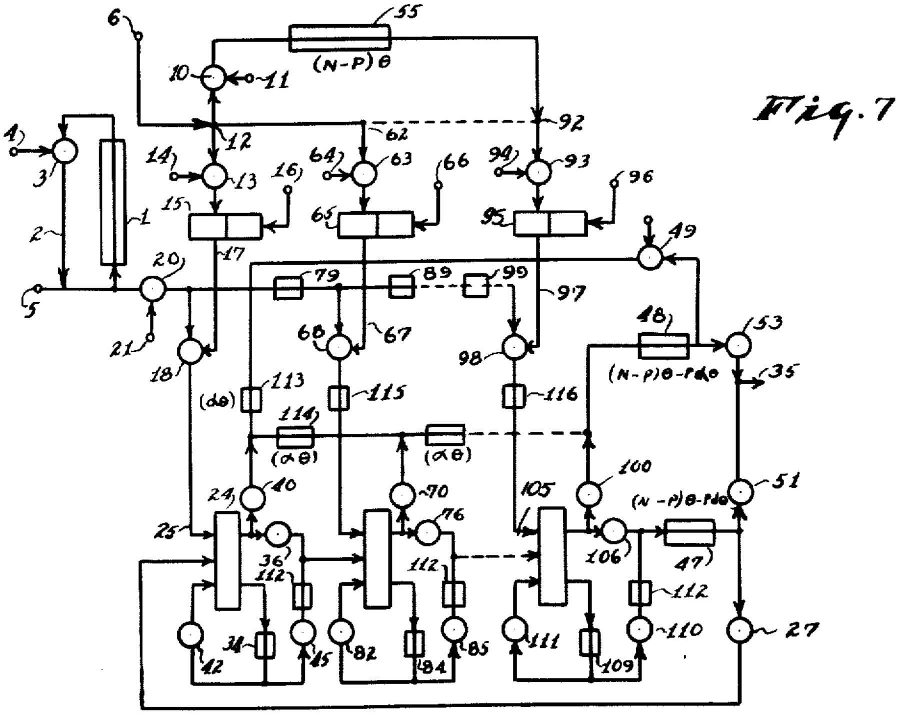
Fig. 7 shows the diagram of Fig. 5 with the insertion of adders such as shown in Fig. 6.

Fig. 7 shows the straightforward inclusion of conditioned adders such as shown in Fig. 6, in the arrangement of Fig. 5. The connection between the output of gate 18 and input 25 of the first adder remains without delay. The connection between the output of gate 68 and input 75 of the second adder includes a delay element 115 having a transit time of $\alpha\theta$, so that the digits from 68 reach input 75 in phase relationship with respect to the digits issuing from the first adder through its gate 36. The other connections include similar delay elements with transit time increasing by $\alpha\theta$, so that the last connection from 98 to 105 includes a delay element having a transit time of $(p-1)\alpha\theta$. The delay line 47 of the accumulative store is provided with a transit time of $(N-\theta)-p.\alpha.\theta$.

The delay line 48 of the lower order product store, when provided, is so arranged as to present a transit time which is also equal to $(N-p)\theta-p.\alpha\theta$. Between the output of gate 49 and the point to which there is connected the output of gate 40, there is inserted a delay element of a transit time equal to $\alpha\theta$, because pulse issuance from gate 4 is delayed by $\alpha\theta$ in this first adder. Since operation of the second adder is also being delayed by $\alpha\theta$, a delay element 114 of this transit time is provided between the outputs of gates 40 and 70; and so forth, thus the overall transit time of the lower order product store is re-established equal to $(N-p)\theta$.

Obviously, the respective controls of the adders are sequentially shifted by a time interval equal to $(1+\alpha)\theta$ instead of a shift of $\theta$ as in Fig. 5.

With these changes, the operative process of Fig. 7 is quite similar to that of any of Figs. 3 to 5, and it is therefore unnecessary to describe such a process in detail.

It must be noted that in the arrangements of Figs. 5 and 7 the pulse distribution of the multiplicand pulse trains to gates 18, 68, . . ., 98, for the constitution of the partial product trains, is obtained through $(p-1)$ delay elements each having a transit time of $\theta$.

Figure 8:
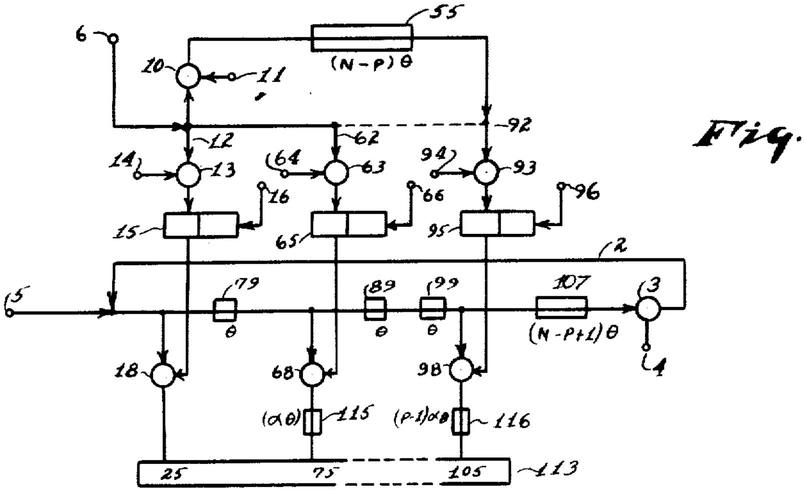
Figs. 8 to 10 illustrate certain alternatives to the embodiments shown in Fig. 7.

A more economical distribution process for such pulses is shown in Fig. 8 wherein these $(p-1)$ delay sections are included in the recirculating store of the multiplicand pulse train M. The delay line of this store, including these $(p-1)$ delay elements, 79, 89, . . . 99, will merely include a delay line 107 having a transit time equal to $(N-p+1)\theta$ to insure a complete recirculation loop of $N\theta$.

Figure 9:
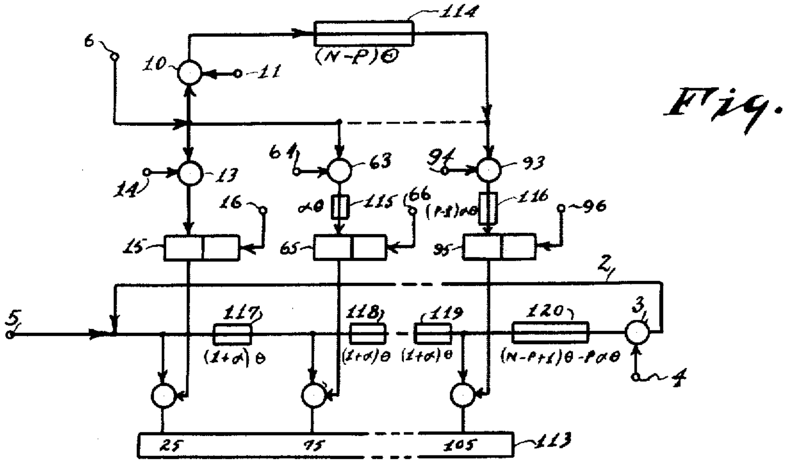
Figure 10:
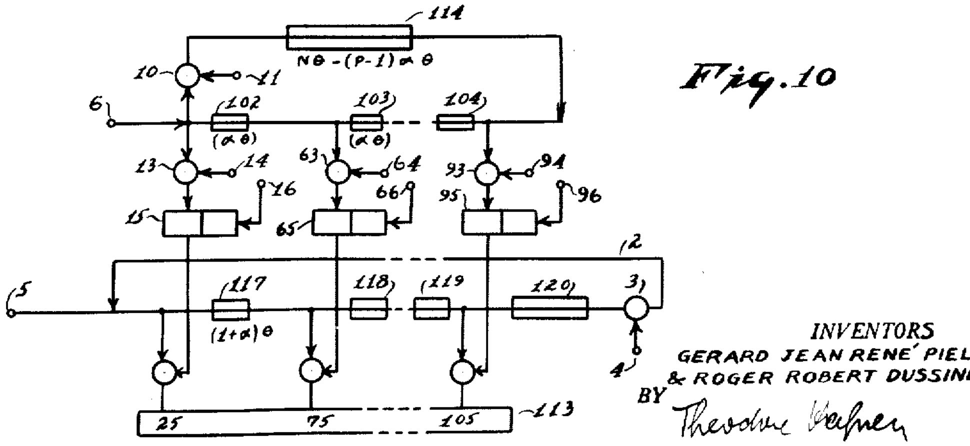

In Fig. 8, as well as in Figs. 9 and 10, all the elements or components of the accumulative store and, when provided, of the lower order product store, together with the gate-conditioned adders, are assumed to be included within the rectangle 113. This rectangle, of course, also includes the components shown in Fig. 7 and these components are arranged in a manner similar to that disclosed in said Fig. 7.

In this manner, the multiplicand loop store 1—2—3 of Fig. 7 may be omitted and the multiplicand pulse train will recirculate with a constantly maintained phase relation from minor cycle to minor cycle throughout the loop 79—89—99—107—3—2. It is quite apparent that the multiplier loop store and distributing arrangement is the same as in Fig. 7. In addition, part 115, may be understood to include all components relating to the product stores incorporated in Fig. 7.

Consequently the operation of the device shown in Fig. 9 is substantially the same as that shown in Fig. 7 and it is therefore unnecessary to describe it in detail.

In the alternative embodiment shown in Fig. 9, delay elements 115, 116, . . . are transferred from the outputs of gates 68, . . ., 98 to the outputs of gates 63, . . ., 93 controlling the one-digit stores 65, . . ., 95. They may also be transferred in the input leads of these latter gates. At each registration of $p$ digits of the multiplier pulse train in the arrangement of Fig. 9, the one-digit storages occur with a sequential phase shift of $(1+\alpha)\theta$. Such a shift must also be provided in the distribution of the digits of the multiplicand pulse train to gates 18, 68, . . ., 98. To this end, $p$ delay elements 117, 118, . . ., 119 having a transit time each equal to $(1+\alpha)\theta$ are substituted in the multiplicand recirculating store for the previously provided delay elements 79, 89, . . . 99 the electrical length of additional delay line 120 is made equal to $N\theta-(p-1)(1+\alpha)\theta$.

The following is based on the assumption that a group of $p$ digits from the multiplier store are present, at a time instant $t_0$, at store outputs extending to gates 15, 65, . . ., 95, with relative phase shifts of $\theta$: The first of these digits is applied by gate 15 to one-digit store 15 without any delay. Consequently, gate 18 will be controlled at the same time instant $t_0$ to pass to input 25 of the product store arrangement, the combination of the multiplier digit with the digit of the multiplicand which is at this very time instant also applied to gate 18.

The second multiplier digit is delayed by $\alpha\theta$ in 115 before being applied to one-digit store 65. Thus gate 68 to the product store arrangement, will only be controlled at input 75 with a delay equal to $\alpha\theta$. The same digit, however, of the multiplicand train has been delayed by $\theta+\alpha\theta$, and consequently the product of the second multiplier digit and first multiplicand digit reaches input 75 at a time interval delayed by $\theta+\alpha\theta$ with respect to the digit which has entered at 25 and, within the store arrangement, has passed through an adder having an internal delay of $\theta+\alpha\theta$, as stated above, and so on. It is apparent that the timings of the operations are then correctly related so that the operation will, finally, terminate in the same result, as that of the arrangement of Fig. 7.

In Fig. 10, the relative shift of $\alpha\theta$ between the partial product pulse trains of a similar group of $p$ pulse trains is obtained (these shifts being added of course to the normal shift of $\theta$ between these trains) through the provision of $(p-1)$ delay elements 102, 103, . . ., 104, each having a transit time of $\alpha\theta$ in the recirculating store of the pulse train representing the multiplier quantity $m$. These delay elements are serially connected and the recirculating loop is completed through the provision of a delay line 114 having an electrical length of $$(N-p)\theta-(p-1)\alpha\theta$$

Gate 10 is controlled to be blocked during a time interval of $p\theta+(p-1)\alpha\theta$ from the start of each minor cycle of the computer. The respective controls of gates 13, 63, . . ., 93 are insured with a relative time shift of $(1+\alpha)\theta$.

It being assumed that a group of $p$ digits of the multiplier train issues from the delay line 114, it is apparent that in their progression through the series-connected delay elements 104—102, they will be separated in time by $\theta+\alpha\theta$ time intervals. Since the connections extending from the output leads from that part of the multiplier recirculating store, one-digit stores 95—65—15 and the following elements, through gates 93—63—13 and the following elements, are passed without any delay, all these $p$ multiplier digits will control these one-digit stores with a time distribution defined by time intervals $(1+\alpha)\theta$. Through these one-digit stores, they will control gates 98, 68, 18, . . . in phase with the corresponding digits of the multiplicand loop store, which are also separated by time intervals $(1+\alpha)\theta$. Consequently, the inputs of the product store arrangement will be selectively supplied at identical time intervals so that the conditions of operation of Fig. 7 are re-established for store arrangement 113. Thus, further description of the operation of Fig. 10 may be dispensed with.

Other minor changes could be made to the embodiments described herein, without departing from the scope of this disclosure.

We claim:

1. In a digital series multiplying device for the multiplication of a multiplicand coded train of binary number pulses and a multiplier coded train of binary number pulses through repeated additions of the partial product coded trains of pulses each one representing the product of the multiplicand coded train by one digit of the multiplier coded train, an accumulative recirculating loop store for the simultaneous additive combination of a plurality of coded trains which is a submultiple of the number of pulse periods in these trains including in combination, a corresponding plurality of adder circuits in cascade connection and a delay line having a number of digital places equal to the number of pulse periods in each of the trains minus the number of said adder circuits, gating means from the output of said delay line to one input of the first adder circuit of said cascade for the recirculation of the pulse train resulting from such a simultaneous additive combination and further gating means for the issuance of a final result pulse train after a number of applications of such pluralities of coded trains which is equal to the quotient of the number of pulse periods in each incoming coded train by the number of said adder circuits, input means for applying each of the incoming coded trains of a plurality to one input of one of said adder circuits, and each one of said adder circuits including: (*a*) gating means in its result output for cancelling thereon any first pulse period digit of any result pulse train therefrom; (*b*) gating means in its internal carry-over feedback loop for cancelling at the output of said loop any carry pulse which may be formed therein at the last pulse period of any of its own addition operation; (*c*) and gating means also in said internal carry-over feedback loop for routing any of such carry pulses as in (*b*) to the result output of the adder circuit in substitution of the canelled result pulse at (*a*).

2. An accumulative recirculating loop store according to claim 1, wherein each one of said adder circuits also includes further gating means for routing to one input of an auxiliary recirculating looped delay line any such result pulse as otherwise cancelled from the normal adder output by the above-said (*a*) gating means, said auxiliary delay line being of the same number of digital places as the accumulative looped delay line and also being provided with recirculating maintenance gating means and pulse train issuance gating means operative in similar manner as the said gating means for the accumulative loop delay line.

3. An accumulative recirculating loop store according to claim 2, wherein means are provided for rendering the said issuance gating means firstly operative in said auxiliary looped delay line and, after a time interval equal to the number of pulse periods in any incoming coded train, then operative in said accumulative looped delay line.

4. An accumulative re-circulating loop store according to claim 2, wherein said input means include means for applying the successive pluralities of said incoming coded trains with a relative time shift equal to the time interval occupied by each and any of the said incoming pulse trains in any of the said pluralities.

5. An accumulative re-circulating loop store according to claim 2, wherein each adder circuit presents a zero internal delay time of operation, and wherein said input means further include means for shifting by one pulse period each incoming pulse train with respect to the next preceding pulse train in the order of the said adder circuits in the cascade connection thereof.

6. An accumulative recirculating loop store according to claim 1, wherein said input means include means for applying the successive pluralities of said incoming coded trains with a relative time shift equal to the time interval occupied by each and any of the said incoming pulse trains in any of said pluralities.

7. An accumulative recirculating loop store according to claim 1, wherein each adder circuit therein presents a zero internal delay time of operation and wherein said input means further include means for shifting by one pulse period each incoming pulse train with respect to the next preceding pulse train in the order of the said adder circuits in the cascade connection thereof.

8. An accumulative recirculating loop store according to claim 1, wherein each adder circuit therein presents a definite internal delay time of operation, said input means include means for shifting by one pulse period plus said definite delay time each incoming pulse train with respect to the next preceding pulse train in the order of the said adder circuits in the cascade connection thereof and the number of digital places in the delay line of said accumulative loop is reduced by an amount representing the product value of the said internal delay by the said number of adder circuits.

9. An accumulative recirculating loop store according to claim 8, wherein each one of said adder circuits also includes further gating means for routing to one input of an auxiliary recirculating looped delay line any such result pulse as otherwise cancelled from the normal adder output by the above-said (*a*) gating means, said auxiliary delay line being of the same number of digital places as the accumulative looped delay line and also being provided with recirculating maintenance gating means and pulse train issuance gating means operative in similar manner as the said gating means for the accumulative loop delay line and wherein the outputs of the said further gating means in said adder circuits to the inputs of the auxiliary recirculating looped delay line are distributed at intervals equal to said internal delay of operation along an additional delay portion of said auxiliary delay line completing the said auxiliary loop to the same number of digital places as the complete accumulative loop including the internal delays of the adder circuits thereof and its own recirculating delay line and wherein each one of said adder circuits also includes further gating means for routing to one input of an auxiliary recirculating looped delay line say such result pulse as otherwise cancelled from the normal adder output by the above-said (*a*) gating means, said auxiliary delay line being of the same number of digital places as the accumulative looped delay line and also being provided with recirculating maintenance gating means and pulse train issuance gating means operative in similar manner as the said gating means for the accumulative loop delay line.

10. A digital series multiplying device for the multiplication of a multiplicand coded train and a multiplier coded train of binary number pulses, comprising in combination, a multiplicand train recirculating loop store repeatedly delivering the coded multiplicand pulse train at a minor cycle frequency to its output, a plurality of gating stages branched off said output so that they receive said multiplicand coded train in uniformly shifted relation with respect to the time, a multiplier train recirculating loop store repeatedly delivering a number of its digits corresponding to said plurality to a plurality of gate stages and repeatedly erasing the said delivered digits within said recirculating loop, a plurality of one-digit stores each one of which is connected to the output of said plurality of gate stages associated to said multiplier store and each one of which is erased after a minor cycle time interval of registration of the correspondingly stored digit from said multiplier coded train, the outputs from said plurality of one-digit stores respectively controlling the said gating stages branched off the output of said multiplicand train store, and an accumulative recirculating loop store including a corresponding plurality of series-connected adder circuits and a delay line from the output of the last of said adder circuits through maintenance gating means to one input of the first adder circuit in said cascade, and issuance gating means branched off the output of said delay line, each adder circuit in said plurality including: (*a*) gating means in its result output for cancelling thereon any first pulse period digit of any result pulse train therefrom; (*b*) gating means in its internal carry-over feedback loop for cancelling at the output of said loop any carry pulse which may be formed therein at the last pulse period of any of its own addition operation; (*c*) and gating means also in said internal carry-over feedback loop for routing any of such carry pulses as in (*b*) to the result output of the adder circuit in substitution of the cancelled result pulses at (*a*); and connections between the respective outputs of said gating stages controlled from said one-digit stores to respective inputs of the adder circuits of the said cascade-connected plurality.

11. A digital series multiplying device according to claim 10, wherein further each one of the adder circuits also includes further gating means for routing to one input of an auxiliary recirculating looped delay line any such result pulse as otherwise cancelled from the normal adder output by the above-said (*a*) gating means of the adder circuit, said auxiliary delay line looped store being of the same number of digital places as the accumulative looped store and also being provided with recirculating maintenance gating means and pulse train issuance gating means.

12. A digital series multiplying device according to claim 10, wherein each one of the adder circuits also includes further gating means for routing to one input of an auxiliary recirculating looped delay line any such result pulse as otherwise cancelled from the normal adder output by the above-said (*a*) gating means of the adder circuit, said auxiliary delay line looped store being of the same number of digital places as the accumulative looped store and also being provided with recirculating maintenance gating means and pulse train issuance gating means and wherein the said plurality is of a value which is an integer submultiple of the number of pulse periods in either the multiplicand or the multiplier coded train, the overall number of digital places in either store is equal to the number of said pulse periods minus the value number of said plurality; said accumulative loop store having maintenance and issuance gating means so controlled as to respectively block the recirculation within said store and issue the final result pulse train therefrom a time interval equal to one minor cycle after the last group of the multiplier train digits has been transmitted to the said plurality of one-digit stores.

13. A digital series multiplying device according to claim 12, wherein each one of the adder circuits also includes further gating means for routing to one input of an auxiliary recirculating looped delay line any such result pulse as otherwise cancelled from the normal adder output by the above-said (*a*) gating means of the adder circuit, said auxiliary delay line looped store being of the same number of digital places as the accumulative looped store and also being provided with recirculating maintenance gating means and pulse train issuance gating means and wherein further the maintenance and issuance gating means of said auxiliary loop store are so controlled as to block the recirculation therein and issue the final result pulse train therefrom as soon as the last group of digits from the said multiplier train store has been transmitted to the said one-digit stores, and wherein each one of the adder circuits also includes further gating means for routing to one input of an auxiliary recirculating looped delay line any such result pulse as otherwise cancelled from the normal adder output by the above-said (*a*) gating means of the adder circuit, said auxiliary delay line looped store being of the same number of digital places as the accumulative looped store and also being provided with recirculating maintenance gating means and pulse train issuance gating means.

14. A digital series multiplying device according to claim 10 wherein each one of the said adder circuit presents a zero internal delay of operation and the delay line in said accumulative store is provided with an effective number of digital places equal to the number of pulse periods in either the multiplicand or multiplier train minus the said number of adder circuits.

15. A digital series multiplying device according to claim 10 wherein each one of the said adder circuits presents a definite internal delay of operation and the delay line in said accumulative store is provided with an effective number of digital places reduced with respect to the preceding value by an amount corresponding to the product value of said internal delay time by the said number of adder circuits.

16. A digital series multiplying device according to claim 15, wherein each one of the adder circuits also includes further gating means for routing to one input of an auxiliary recirculating looped delay line any such result pulse as otherwise cancelled from the normal output by the above-said (*a*) gating means of the adder circuit, said auxiliary delay line looped store being of the same number of digital places as the acumulative looped store and also being provided with recirculating maintenance gating means and pulse train issuance gating means and wherein further the outputs of the said adder circuits to the said auxiliary delay line loop store are distributed to input places in said delay line having a relative time interval equal to the said internal delay of operation of one of said adder circuits, wherein each one of the adder circuits also includes further gating means for routing to one input of an auxiliary recirculating looped delay line any such result pulse as otherwise cancelled from the normal output by the above-said (*a*) gating means of the adder circuit, said auxiliary delay line looped store being of the same number of digital places as the accumulative looped store and also being provided with recirculating maintenance gating means and pulse train issuance gating means.

17. A digital series multiplying device according to claim 10, wherein the said gating stages controlled from the said one-digit stores receive the multiplicand pulse train from distributed taps along the internal delay line of said multiplicand train recirculating store.

18. A digital series multiplying device according to claim 17, wherein said distributed taps are taken at intervals equal to one pulse period of the multiplicand pulse train, and wherein each one of the said adder circuits presents a zero internal delay of operation and the delay line in said accumulative store is provided with an effective number of digital places equal to the number of pulse periods in either the multiplicand or multiplier train minus the said number of adder circuits.

19. A digital series multiplying device according to claim 17, wherein said distributed taps at intervals equal to one pulse period of the multiplicand pulse train and delay elements are inserted between the respective outputs from said gating stages controlled from said one-digit stores to the respective inputs of the adders of said plurality such that the pulse trains issuing from said gating stages are progressively shifted in time by said internal delay in their applications to the said adder circuits, and wherein each one of the said adder circuits presents a definite internal delay of operation and the delay line in said accumulative store is provided with an effective number of digital places reduced with respect to the preceding value by an amount corresponding to the product value of said internal delay time by the said number of adder circuits.

20. A digital series multiplying device according to claim 17, wherein said distributed taps are taken at intervals equal to one pulse period of the multiplicand pulse train plus said internal delay time, and means are provided for actuating the said one-digit stores from the said multiplier recirculating loop store with progressive delays increasing by said internal delay in the order of said one-digit stores corresponding to the order of the said adder circuits in their cascade connection, and wherein each one of the said adder circuits presents a definite internal delay of operation and the delay line in said accumulative store is provided with an effective number of digital places reduced with respect to the preceding value by an amount corresponding to the product value of said internal delay time by the said number of adder circuits.

21. A digital series multiplying device according to claim 20, wherein said actuating means include corresponding delay elements between the gate stages routing the multiplier train digits to said one-digit stores and the inputs of these one-digit stores.

22. A digital series multiplying device according to claim 20, wherein said actuating means include taps distributed at intervals each one equal to said internal delay from the delay line in the multiplier recirculating loop store to the corresponding inputs of the gate stages routing the multiplier digits to said gate stages controlling said one-digit stores.

23. A digital series multiplying device according to claim 10, wherein each adder circuit includes an auxiliary recirculating looped delay line and further gating means for routing to one input of said auxiliary recirculating looped delay line any such result pulse as otherwise cancelled from the normal adder output; and wherein the said plurality of one-digit stores corresponds to an integer submultiple of the number of pulse periods in either multiplicand or multiplier coded train, the overall number of digital places in either store being equal to the number of said pulse periods minus the value number of said plurality, and the maintenance and output gating means of said accumulative loop store being so controlled as respectively to block the recirculation within said store and issue the final result pulse train therefrom a time interval equal to one minor cycle after the last group of the multiplier train digits has been transmitted to said one-digit stores.

24. A digital series multiplying device according to claim 10, wherein each adder circuit includes an auxiliary recirculating looped delay line and further gating means for routing to one input of said auxiliary recirculating looped delay line any such result pulse as otherwise cancelled from the normal adder output, said auxiliary delay line being of the same number of digital places as the accumulative looped store, and wherein the said gating stages controlled from the said one-digit stores receive the multiplicand pulse train from an additional delay line supplied from said multiplicand recirculating store.

25. A digital series multiplying device according to claim 10, wherein each one of the adder circuits includes an auxiliary recirculating looped delay line and further gating means for routing to one input of said auxiliary recirculating looped delay line any such result pulse as otherwise cancelled from the normal adder output, and wherein the said gating stages controlled from the said one-digit stores receive the multiplicand pulse train from the internal delay line of said multiplicand recirculating store.

26. A digital series multiplying device according to claim 10, wherein the gating stages controlled from the said one-digit stores receive the multiplicand pulse train from distributed taps of an additional delay line supplied from said multiplicand recirculating store and taken at intervals equal to one pulse period of the multiplicand pulse train, and wherein each adder circuit presents a zero internal delay of operation and the delay line in said accumulative store is provided with an effective number of digital places equal to the number of pulse periods in either multiplicand or multiplier train minus the number of adder circuits.

27. A digital series multiplying device according to claim 10, wherein each adder circuit includes an auxiliary recirculating looped delay line having distributed taps and further gating means for routing to one output of said auxiliary recirculating looped delay line any such result pulse as otherwise cancelled from the normal adder output, there being provided an additional delay line supplied from said multiplicand recirculating store and taken at intervals equal to one pulse period of the multiplicand pulse train and having distributed taps supplying the said gating stages controlled from the said one-digit stores, each adder circuit presenting a zero internal delay and the delay line in said accumulative store being provided with an effective number of digital places equal to the number of pulse periods in either multiplicand or multiplier train minus the number of adder circuits.

28. A digital series multiplying device according to claim 10, wherein each adder circuit also includes an auxiliary recirculating looped delay line and further gating means for routing to said auxiliary recirculating looped delay line any such result pulse as otherwise cancelled from the normal adder output, said auxiliary delay line being of the same number of digital places as the accumulative looped store, and wherein the said gating stages controlled from the said one-digit stores receive the multiplicand pulse train from distributed taps of the internal delay line of said multiplicand recirculating store taken at intervals equal to one pulse period of the multiplicand pulse rate, there being provided delay elements between the outputs from said gating stages controlled from said one-digit stores to the inputs of the adders such that the pulse trains issuing from said gating stages are progressively shifted in time, each one of the said adder circuits presenting a definite internal delay, and the delay line in said accumulative store being provided with an effective number of digital places reduced with respect to the preceding value by an amount corresponding to the product value of said internal delay time by the number of adder circuits.

29. A digital series multiplying device according to claim 10, wherein each one of the adder circuits includes an auxiliary recirculating looped delay line and further gating means for routing to said auxiliary recirculating looped delay line any such result pulses as otherwise cancelled from the normal adder output, and wherein the gating stages controlled from said one-digit stores receive the multiplicand pulse train from distributed taps of the internal delay line of said multiplicand recirculating store, taken at intervals equal to one pulse period of the multiplicand pulse train, there being provided delay elements between the outputs from said gating stages controlled from said one-digit stores to the inputs of the adders such that the pulse trains issuing from said gating stages are progressively shifted in time; said actuating means including corresponding delay elements between the gate stages routing the multiplier train digits to said one-digit stores.

30. A digital series multiplying device according to claim 10, wherein the gating stages controlled from said one-digit stores receive the multiplicand pulse train from distributed taps of an internal delay line of the multiplicand recirculating store, taken at intervals equal to one pulse period of the multiplicand pulse train plus said internal delay time, there being provided means for actuating said one-digit stores from the multiplier recirculating store with progressive delays increasing by said internal delay in the order of said one-digit stores corresponding to the order of the adder circuits in their cascade connection.

31. A digital series multiplying device according to claim 10, wherein each adder circuit includes an auxiliary recirculating looped delay line and further gating means for routing to said auxiliary recirculating looped delay line any such result pulse as otherwise cancelled from the normal output, said auxiliary delay line being of the same number of digital places as the accumulative looped store, and wherein the said gating stages controlled from the said one-digit stores receive the multiplicand pulse train from distributed taps of the internal delay line of said multiplicand recirculating store, taken at intervals equal to one pulse period of the multiplicand pulse train plus an internal delay time, there being provided means for actuating the said one-digit stores from said multiplier recirculating store with progressive delays increasing by said internal delay in the order of said one-digit stores corresponding to the order of the said adder circuits in their cascade connection, each one of the said adder circuits presenting a definite internal delay of operation and the delay line in said accumulative store being provided with an effective number of digital places reduced with respect to the preceding value by an amount corresponding to the product value of said internal delay time by the number of adder circuits; said actuating means including taps distributed at intervals each one equal to said internal delay from the delay line in the multiplier recirculating store to the corresponding inputs of the gate stages routing the multiplier digits to the gate stages controlling the one-digit stores.

32. A digital series multiplying device according to claim 10, wherein the said gating stages controlled from the said one-digit stores receive the multiplicand pulse train from distributed taps of an internal delay line of the multiplicand recirculating store, taken at intervals equal to one pulse period of the multiplicand pulse train plus said internal delay time; there being provided means for actuating the one-digit stores from the multiplier recirculating loop store with progressive delays increasing by said internal delay in the order of said one-digit stores corresponding to the order of the adder circuits in their cascade connection; said actuating means including corresponding delay elements between the gate stages routing the multiplier train digits to the inputs of said one-digit stores.

33. A digital series multiplying device according to claim 10, wherein each adder circuit includes an auxiliary recirculating looped delay line and further gating means for routing to said auxiliary recirculating looped delay line any such result pulse as otherwise cancelled from the normal adder output, said auxiliary delay line being of the same number of digital places as the accumulative looped store, and wherein the gating stages controlled from said one-digit stores receive the multiplicand pulse train from taps of the internal delay line of said multiplicand recirculating store, taken at intervals equal to one pulse period of the multiplicand pulse train plus said internal delay time; there being provided means for actuating said one-digit stores from the multiplier recirculating loop store with progressive delays increasing by said internal delay in the order of said one-digit stores corresponding to the order of the adder circuits in their cascade connection; said actuating means including corresponding delay elements between the gate stages routing the multiplier train digits to said one-digit stores, each adder circuit presenting a definite internal delay of operation and the delay line in said accumulative store being provided with an effective number of digital places reduced with respect to the preceding value by an amount corresponding to the product value of said internal delay time by the number of adder circuits.

34. A digital series multiplying device according to claim 10, wherein the gating stages controlled from the one-digit stores receive the multiplicand pulse train from distributed taps of an internal delay line of said multiplicand recirculating store; there being provided means for actuating the one-digit stores from the multiplier recirculating loop store with progressive delays increasing by the internal delay in the order of said one-digit stores corresponding to the other of the adder circuits in their cascade connection, said actuating means including taps distributed at intervals equal to said internal delay time from the delay line in the multiplier recirculating loop store to the corresponding inputs of the gate stages routing the multiplier digits to the gate stages controlling the one-digit stores.

35. A digital series multiplying device according to claim 10, wherein each adder circuit also includes an auxiliary recirculating looped delay line and further gating means for routing to said auxiliary recirculating looped delay line any such result pulse as otherwise cancelled from the normal adder output; said auxiliary delay line being of the same number of digital places as the accumulative looped store and also being provided with recirculating maintenance gating means and pulse train issuance gating means, and wherein the gating stages controlled from the said one-digit stores receive the multiplicand pulse train from distributed taps of an internal delay line of said multiplicand recirculating store, taken at intervals equal to one pulse period of the multiplicand pulse train plus said internal delay time; there being provided means for actuating the one-digit stores from the multiplier recirculating loop store with progressive delays increasing by said internal delay in the order of said one-digit stores corresponding to the order of the adder circuits in their cascade connection; said actuating means including taps distributed at intervals each one equal to said internal delay time from the delay line in the multiplier recirculating loop store to the corresponding inputs of the gate stages routing the multiplier digits to the gate stages controlling the one-digit stores, each adder circuit presenting a definite internal delay of operation and the delay line in said accumulative store being provided with an effective number of digital places reduced with respect to the preceding value by an amount corresponding to the product value of said internal delay time by the number of adder circuits.

36. A digital series multiplying device according to claim 10 comprising an additional delay line supplied from the multiplicand pulse train recirculating loop store output and having distributed taps supplying the gating stages controlled from said one-digit stores.

References Cited in the fiie of this patent

UNITED STATES PATENTS

| | | |
|---|---|---|
| 2,686,632 | Wilkinson | Aug. 17, 1954 |
| 2,711,526 | Gloess | June 21, 1955 |
| 2,758,787 | Felker | Aug. 14, 1956 |
| 2,771,244 | Raymond | Nov. 20, 1956 |

OTHER REFERENCES

A functional description of Edvac, volume II, sheet 104–3LD–2 (diagram); volume I, pages 4–18 to 4–23, Moore School of Engineering, Nov. 1, 1949.